United States Patent
Satoh et al.

(10) Patent No.: US 7,061,211 B2
(45) Date of Patent: Jun. 13, 2006

(54) GAS TURBINE GENERATING APPARATUS

(75) Inventors: Motoyasu Satoh, Tokyo (JP); Seiichi Ishihara, Tokyo (JP); Noboru Kinoshita, Tokyo (JP); Takahide Ozawa, Tokyo (JP); Shao-jun Zheng, Tokyo (JP); Terence Mckelvey, Tokyo (JP); Tadashi Kataoka, Tokyo (JP)

(73) Assignees: Ebara Corporation, Tokyo (JP); Ebara Densan Ltd., Tokyo (JP)

( * ) Notice: Subject to any disclaimer, the term of this patent is extended or adjusted under 35 U.S.C. 154(b) by 0 days.

(21) Appl. No.: 11/079,099

(22) Filed: Mar. 15, 2005

(65) Prior Publication Data

US 2005/0179420 A1     Aug. 18, 2005

Related U.S. Application Data

(62) Division of application No. 10/477,750, filed as application No. PCT/JP02/05009 on May 23, 2002, now Pat. No. 6,888,263.

(30) Foreign Application Priority Data

May 23, 2001   (JP)   ............................. 2001-154055
Apr. 18, 2002  (JP)   ............................. 2002-116311

(51) Int. Cl.
    *H02P 3/00* (2006.01)
(52) U.S. Cl. ...................... 322/12; 322/10; 322/14; 322/32; 322/29
(58) Field of Classification Search .................. 322/10, 322/12, 14, 32, 29
    See application file for complete search history.

(56) References Cited

U.S. PATENT DOCUMENTS 5,384,527 A * 1/1995 Rozman et al. ............... 322/10
5,493,200 A * 2/1996 Rozman et al. ............... 322/10
6,410,992 B1   6/2002 Wall et al.
6,495,929 B1   12/2002 Bosley et al.
6,605,928 B1 * 8/2003 Gupta et al. .................. 322/10

FOREIGN PATENT DOCUMENTS

| EP | 0963035 | 12/1999 |
| JP | 10-191699 | 7/1998 |
| JP | 11-285260 | 10/1999 |

* cited by examiner

*Primary Examiner*—Darren Schuberg
*Assistant Examiner*—Iraj Mohandesi
(74) *Attorney, Agent, or Firm*—Oblon, Spivak, McClelland, Maier & Neustadt, P.C.

(57) ABSTRACT

A gas turbine generating apparatus according to the present invention comprises a gas turbine capable of a high-speed operation, a permanent-magnet-type generator driven at a high speed by the gas turbine, an inverter device (5) for converting alternating-current power generated by the generator into commercial alternating-current power, and a system-interconnection device (9) for interconnecting output of the inverter device to a commercial AC power supply system (10). The system-interconnection device controls the inverter device based on voltage of the commercial AC power supply system as a criterion such that output current of the inverter device is in phase with the voltage or out of phase with the voltage by a constant phase difference. A control device (18) is provided for operating the permanent-magnet-type generator (4) as a motor at a time of starting the gas turbine, and supplying alternating-current power from a direct-current power supply through the inverter device or another inverter device in addition to the inverter device to the generator for increasing a rotational speed smoothly from zero. The control device detects output current of the inverter device and controls the inverter device to keep the output current constant.

4 Claims, 4 Drawing Sheets

GAS TURBINE GENERATING APPARATUS

CROSS-REFERENCE TO RELATED APPLICATIONS

This application is a divisional of U.S. application Ser. No. 10/477,750, filed Apr. 6, 2004, now U.S. Pat. No. 6,888,263, which is the National Stage of International Application No. PCT/JP02/05009, filed May 23, 2002. The contents of those applications are incorporated herein by reference in their entirety.

TECHNICAL FIELD

The present invention relates to a gas turbine generating apparatus, and more particularly to a generating apparatus for generating electric power with the use of a small-sized gas turbine engine capable of a high-speed operation and a generator.

BACKGROUND ART

Heretofore, in general, a generating apparatus using a reciprocating engine has been known as a generating facility that can be utilized easily. Such a generating apparatus generates alternating-current power by supplying a fuel such as petroleum to the reciprocating engine to drive a generator that is coupled to the reciprocating engine. Since this type of generating facility can generate the alternating-current power easily, the generating facility has been widely used for emergency.

A cogeneration-type generating facility using a large-sized turbine generator is employed in a factory or the like. The cogeneration-type generating facility has a large-sized gas turbine engine which is operated with the use of petroleum or gas fuel for driving a generator directly coupled to the gas turbine engine to generate the alternating-current power. With the cogeneration-type generating facility, the alternating-current power generated by the generator can be utilized in the factory, and exhaust heat generated by the gas turbine engine can also be utilized as well in the factory. Therefore, an overall energy-utilization-efficiency can be increased. However, such generating facility has been problematic in that the generating facility is large in size and thus requires a large space for the installation. Further, a high initial cost is required to introduce the generating facility.

Recently, as the electric power market is liberalized under the deregulation of the electric power, there has been a growing attention to a small-sized gas turbine generating facility as a local-distributed power supply. If the gas turbine generating facility generates electric power which is surplus to requirements in a private electric power consumption, then it is preferable to interconnect the gas turbine generating facility to a commercial power supply system so as to supply the surplus electric power to the exterior. However, in order to supply the surplus electric power to the commercial power supply system, voltage, frequency, phase, and the like of the electric power to be supplied are required to agree with those of the commercial power supply system completely. Further, it is desirable that the generating facility can be operated automatically and stably. In particular, it is desirable to reach a steady-operation state in as short a period of time as possible at the time of starting.

DISCLOSURE OF INVENTION

The present invention has been made in view of the above circumstances. It is an object of the present invention to provide a gas turbine generating apparatus which can be easily interconnected to a commercial power supply system and can supply alternating-current power at a desired power factor, e.g., a power factor of 1, to the commercial power supply system.

Another object of the present invention is to provide a gas turbine generating apparatus which can be started easily and quickly.

There is provided a gas turbine generating apparatus, comprising: a gas turbine capable of a high-speed operation; a permanent-magnet-type generator driven at a high speed by the gas turbine; an inverter device for converting alternating-current power generated by the generator into commercial alternating-current power; and a system-interconnection device for interconnecting output of the inverter device to a commercial AC power supply system; wherein the system-interconnection device controls the inverter device based on voltage of the commercial AC power supply system as a criterion such that output current of the inverter device is in phase with the voltage or out of phase with the voltage by a constant phase difference.

According to the present invention described above, since the output current of the inverter device is controlled so as to be kept in phase with the voltage of the commercial AC power supply system based on said voltage, the output current supplied from the inverter device to the commercial power supply system is in phase with the voltage of the commercial power supply system. Therefore, electric power at a power factor of 100% can be output to the commercial power supply system. Since no reactive electric power is supplied to the commercial power supply system, the system interconnection can be carried out at a high efficiency.

Such a system interconnection control can be achieved by detecting the voltage of the commercial AC power supply system with the use of a voltage detector (PT), detecting the output current of the inverter device with the use of a current detector (CT), and controlling the inverter device so as to bring the output current into phase with the voltage of the commercial power supply system. Therefore, the electric power generated by the generator directly coupled to the gas turbine can be delivered at a power factor of 100% to the commercial power supply system with a relatively simple structure. The power factor can be set to a predetermined value which is less than 100% by controlling the phase as desired.

Further, there is provided a gas turbine generating apparatus, comprising: a gas turbine capable of a high-speed operation; a permanent-magnet-type generator driven by the gas turbine at a high speed; an inverter device for converting alternating-current power generated by the generator into commercial alternating-current power; a control device for operating the permanent-magnet-type generator as a motor at a time of starting the gas turbine, and supplying alternating-current power from a direct-current power supply through the inverter device or another inverter device in addition to the inverter device to the generator for increasing a rotational speed smoothly from zero; wherein the control device detects output current of the inverter device and controls the inverter device to keep the output current constant.

Said control device increases an output frequency of said inverter device from zero to a predetermined frequency within a short period of time when said gas turbine is started.

According to the present invention described above, while the rotational speed of the generator operated as a motor is increased from zero to a predetermined rotational speed by the inverter device, the output current of the inverter device is detected, and the inverter device is controlled to keep the output current constant. Therefore, allowable maximum current can be supplied continuously to the generator operated as a motor. The generator can thus reach the predetermined speed in a shortest period of time within the range of the electric power capacity of the generator.

Said direct-current power supply used to start said gas turbine comprises a storage battery. With a plurality of storage batteries connected in series, it is possible to supply relatively high direct voltage to the input of a booster. Said direct-current power supply used to start said gas turbine may be produced by rectifying alternating-current power of a commercial AC power supply system. In the case where the commercial AC power supply system is available, it is possible to dispense with a facility such as the storage battery.

BEST MODE FOR CARRYING OUT THE INVENTION

Embodiments of the present invention will be described below with reference to the accompanying drawings.

Figure 1:
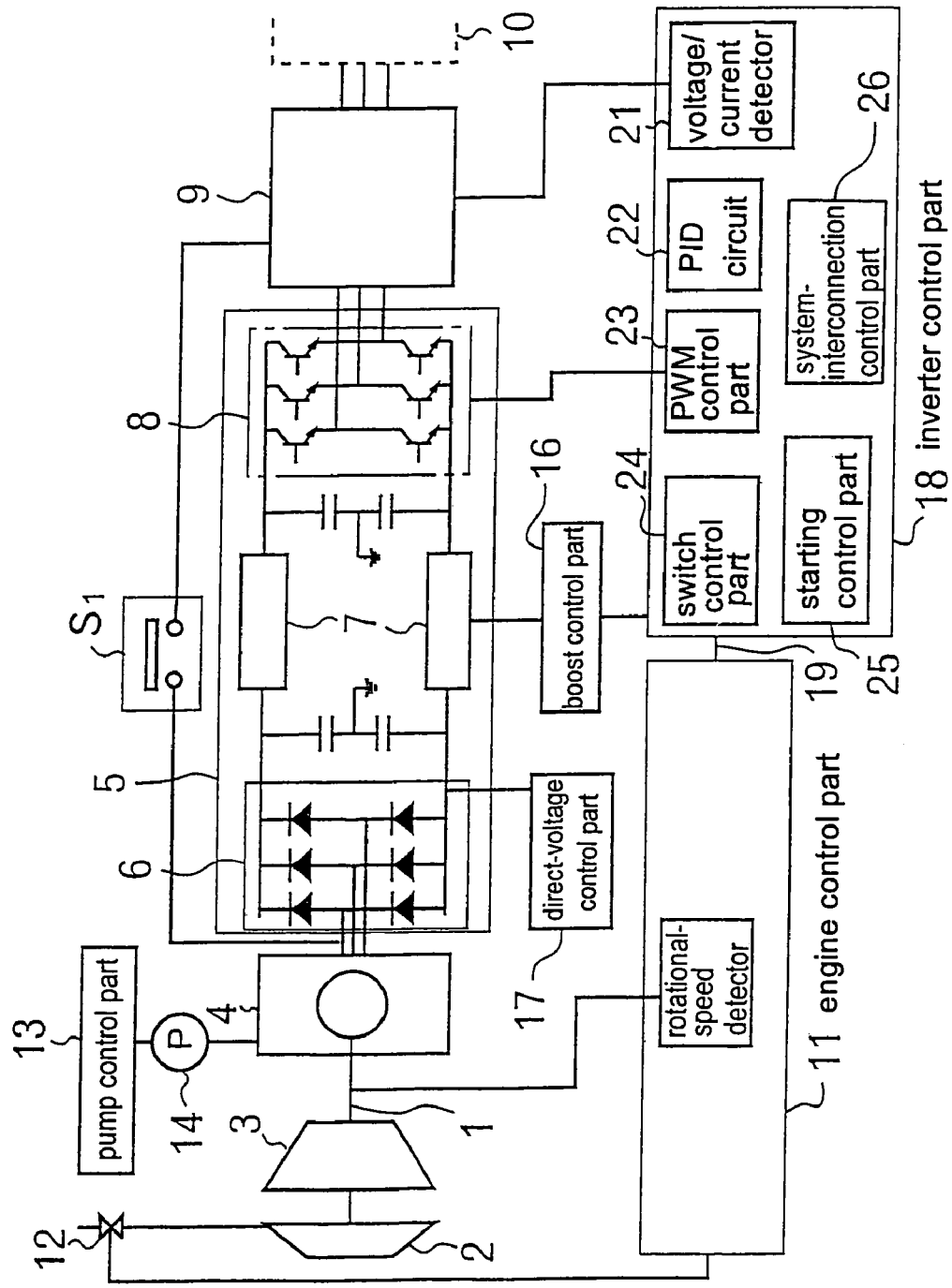
FIG. 1 is a schematic view showing a control system incorporated in a gas turbine generating apparatus.

FIG. 1 is a schematic view showing a control system incorporated in a gas turbine generating apparatus according to an embodiment of the present invention. A turbine generator unit comprises a single rotating shaft 1 to which a turbine rotor 2, a compressor rotor 3, and a rotor of an alternating-current generator 4 are fixed. The alternating-current generator 4 comprises a permanent-magnet-type generator having permanent magnets mounted on a circumferential surface of the rotor. A stator is disposed at a circumferential side of the rotor, and induced voltage generated by the rotation of the rotor is output from windings of the stator. Since the permanent-magnet-type generator is employed, no current loss occurs in the rotor, and hence an excellent generating efficiency can be obtained.

As described above, the rotating shaft 1 is rotated at a high speed, e.g., of 100,000 $\text{min}^{-1}$, and hence the alternating-current generator 4 generates electric power at a high frequency. In this manner, since the alternating-current generator 4 is rotated at a high speed, the alternating-current generator 4 can generate a high output although the generator 4 is small in size. The alternating-current generator 4 is operated as a motor by supplying the alternating voltage to the stator windings.

The apparatus comprises an inverter device 5 including a direct-current converter 6 for rectifying the electric power generated by the generator 4 fixed to the rotating shaft of the turbine rotor which rotates at a high speed, a booster 7 for boosting the rectified direct-current voltage, and an inverter 8 for converting the boosted voltage into alternating-current power having the same frequency, voltage, and phase as those of a commercial power supply system. The output of the inverter device 5 is delivered to the commercial power supply system 10 through an interconnection device 9.

The output of the alternating-current generator 4 is supplied to the inverter device 5 and is then adjusted to agree with the frequency, voltage, and phase of the commercial power supply system. The inverter device is controlled by an inverter control part 18 which comprises a microprocessor. The inverter control part 18 comprises a voltage/current detector 21 for detecting the voltage of the commercial power supply system and the output current of the inverter device, a PID control circuit 22, a control part 23 for controlling the inverter 8, and the like. A pulse-width-modulation control produces the alternating-current output having desired voltage, frequency, and phase. Further, the inverter control part 18 has a switch control part 24 for controlling the opening motion and the closing motion of various types of switches, a starting control part 25 for controlling the starting of the generating apparatus, a system-interconnection control part 26 for controlling the timing of interconnection to the commercial power supply system, and the like.

A boost control part 16 controls the direct voltage of the booster 7 which comprises a DC/DC converter. A direct-voltage control part 17 introduces the direct voltage to input terminals S+, S– of the booster 7 when the micro gas turbine generating apparatus is started. The boost control part 16 controls the booster 7 to boost the direct voltage and then the direct voltage is supplied to the inverter 8. The inverter 8 generates an alternating waveform based on the voltage at the time of starting, and supplies the alternating waveform through a switch $S_1$ to the alternating-current generator 4, thus driving the alternating-current generator 4 as a motor. Alternatively, an inverter device may be provided in addition to the inverter 8 for supplying electric power to the alternating-current generator 4, which is operated as a motor. An engine control part 11 performs a control based on a rotational speed detected by a rotational-speed detector provided near the rotating shaft 1. The engine control part and the inverter control part are connected to each other by a signal line 19, so that information is exchanged with each other.

In this embodiment, although a storage battery is used as a direct-current power supply, a direct-current power supply for starting the gas turbine can be produced by rectifying the alternating-current power of the commercial AC power supply system. In this case, it is possible to dispense with a heavyweight storage battery, and hence the burden for maintenance can be reduced and the overall apparatus can be lightweight. Further, it is advantageous in starting characteristics because relatively high voltage can be supplied from the inverter device to the generator that is operated as a motor at the time of starting.

Figure 2:
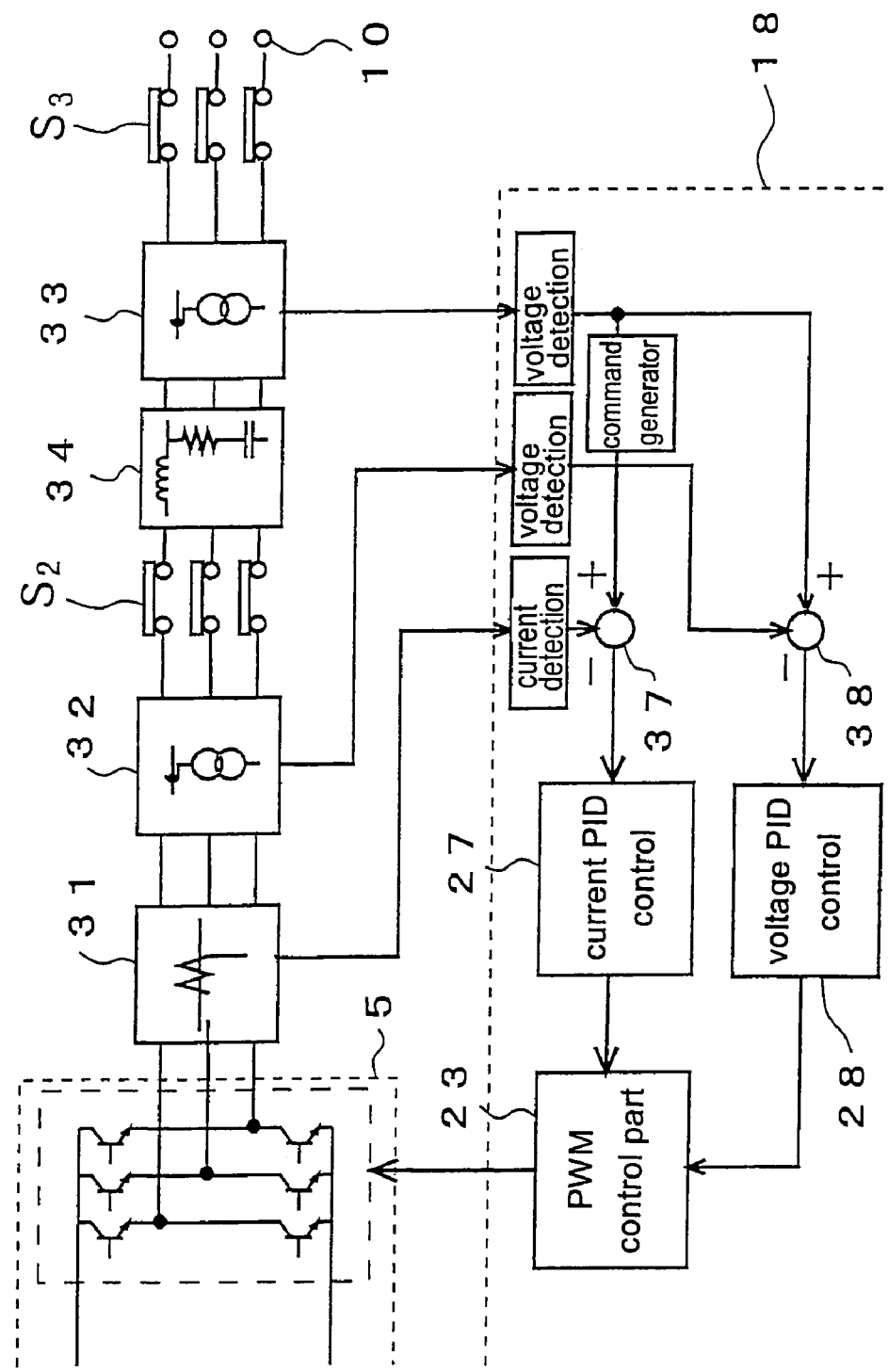
FIG. 2 is a view showing an essential part of the control system according to a first embodiment of the present invention.

Next, a system interconnection operation of the generating apparatus will be described with reference to FIGS. 2 through 4. FIG. 2 shows a system-interconnection device for connecting the output of the inverter device and the commercial power supply system to each other.

A current detector (CT) 31 for detecting output current of the inverter device 5, a voltage detector (PT) 32 for detecting a voltage of the inverter device, switches $S_2$, $S_3$ for connecting the output of the generating apparatus to the power supply system, and a voltage detector (PT) 33 for detecting a voltage of the commercial power supply system are disposed between output terminals of the inverter device 5 and connecting terminals 10 of the commercial power supply system. The CT 31 is connected to a current-detecting circuit incorporated in the inverter control part 18, and the PT 32 and the PT 33 are connected respectively to voltage-detecting circuits incorporated in the inverter control part 18. A filter circuit 34 is provided to remove harmonic component contained in the output waveform of the inverter device.

The inverter control part 18 has a PID control part 27. A comparator 37 calculates an error signal between a command signal that is defined by voltage of the commercial power supply system detected by the PT 33 and a feedback signal that is defined by the output current of the inverter device 5 detected by the CT 31. The PID control part 27 generates a control signal for eliminating the error signal. The PWM control part 23 performs a pulse-width-modulation control on power switching elements of the inverter device based on the control signal, and controls current-signal waveform to follow voltage-signal waveform. On the other hand, the inverter control part 18 also has a PID control part 28. A comparator 38 calculates an error signal between the command signal that is defined by the voltage of the commercial AC power supply system detected by the PT 33 and a feedback signal that is defined by the output voltage of the inverter device 5 detected by the PT 32. The PID control part 28 generates a control signal for eliminating the error signal. The PWM control part 23 performs a pulse-width-modulation control on the power switching elements of the inverter device based on the control signal, and controls the output-voltage-signal waveform of the inverter device to follow the voltage-signal waveform of the commercial power supply system.

Figures 3A, 3B:
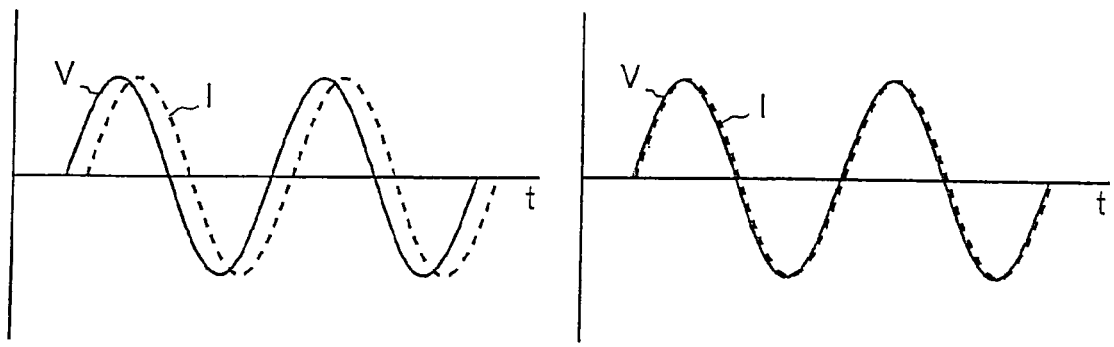
FIG. 3A is a diagram showing a state in which voltage and current are out of phase with each other.
FIG. 3B is a diagram showing a state in which the voltage and the current are in phase with each other after a system interconnection.
Figure 4:
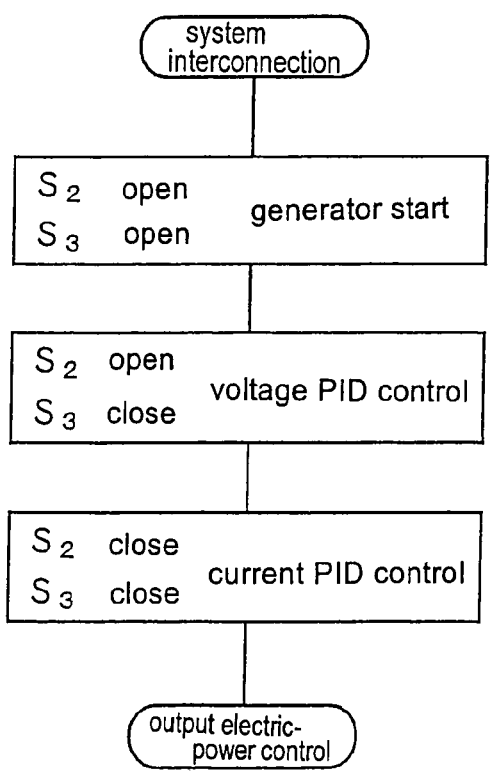
FIG. 4 is a flowchart showing a system interconnection operation of the gas turbine apparatus.

FIGS. 3A and 3B show an example in which the output current of the inverter device is controlled so as to be in phase with the voltage of the commercial AC power supply system. FIG. 3A illustrates the manner in which the output current I of the inverter device is out of phase with the voltage V of the commercial AC power supply system. In the current control of the inverter device described above, the voltage of the AC power supply system which serves as a criterion and the output current of the inverter device which serves as the feedback signal are normalized with respect to their amplitudes, respectively, and are set such that if they are in phase with each other, then the error signal is zero. As shown in FIG. 3A, the PID control part 27 outputs a control signal for eliminating the error ε between the voltage V of the commercial AC power supply system which serves as a command signal and the output current I of the inverter device 5 which serves as the feedback signal, thereby controlling the on-off time of the switching elements of the inverter device. Therefore, the output current of the inverter device follows the voltage V of the commercial AC power supply system as shown in FIG. 3B and is thus in phase with the voltage V. Alternatively, the voltage V and the current I may be controlled such that they are kept out of phase with each other by a certain phase difference. Further alternatively, the PID control part 28 may control the PWM control part to output a pulse-width-modulation signal for controlling the waveform of the output voltage of the inverter device to agree with the waveform of the voltage of the commercial power supply system.

According to the control operation performed by the PID control part 27 described above, the switching of the power elements of the inverter device is controlled such that the current output of the inverter device is in phase with the current command generated on the basis of the phase of the voltage of the commercial power supply system. Accordingly, the alternating-output current of the inverter device contains a small amount of harmonic component and can thus fully meet the harmonic-restraint standard and the power-factor standard that are required for the commercial power supply system. The filter circuit 34 connected to the output side of the inverter device can be small and compact because the filter circuit 34 is provided only for removing the harmonic component due to the pulse-width-modulation control performed on the power switching elements.

Therefore, according to the output control on the inverter device, the circuit arrangement can be much simpler than the conventional circuit arrangement in which the output voltage of the inverter device has a waveform generated on the basis of the voltage of the commercial power supply in consideration of an impedance drop in the filter circuit. Further, an interconnection reactor having a large inductance is not required, and hence the overall apparatus can be small and compact.

Next, the system interconnection operation of the generating apparatus will be described with reference to FIG. 4. First, the generator performs a starting operation which is described later with the switches $S_2$, $S_3$ being opened. When the generator reaches a predetermined rotational speed, the operation is switched to a voltage PID control. Specifically, the PWM control part 23 controls the inverter device to generate the output voltage waveform having the same voltage, frequency, and phase as those of the voltage of the commercial power supply system. At this time, the switch $S_2$ is still opened but the switch $S_3$ is closed to allow the inverter control part 18 to detect the voltage waveform of the commercial power supply system. The voltage waveform of the commercial power supply system is transmitted through the PT 33 and is detected by the voltage-detecting circuit of the inverter control part 18. On the other hand, the output voltage waveform of the inverter device is detected through the PT 32 by the voltage-detecting circuit of the inverter control part 18.

The voltage PID control part 28 uses the voltage signal of the commercial power supply system as the command and the output voltage signal of the inverter device as the feedback signal. The voltage PID control part 28 controls the PWM control part 23 to perform the pulse-width-modulation control on the switching of the power elements the inverter device. Therefore, the inverter device outputs the voltage waveform which agrees with the voltage waveform of the commercial power supply system. In this state, the switch $S_2$ is closed to connect the inverter device to the commercial power supply system, thus starting a system interconnection. The switch $S_2$ is closed, and at the same time, the PID control part for inputting the signal to the PWM control part 23 is switched from the voltage PID control part 28 to the current PID control part 27.

In order to deliver the output electric power of the generator to the commercial power supply system, the amount of fuel supplied to the gas turbine engine is increased by a fuel control part. Accordingly, the generated output is increased and the electric power is delivered to the commercial power supply system. At this time, the output current waveform of the inverter device is detected by the CT 31 performing the current-detecting process. The detected current waveform is input as the feedback signal to the comparator 37. On the other hand, the current command generated on the basis of the voltage waveform of the commercial power supply system as a phase reference signal is input to the comparator 37. The error signal as a difference is input to the current PID control part 27, which sends the control signal for eliminating the error signal to the PWM control part 23. A pulse-width-modulation control is carried out on the switching of the power elements of the inverter device 5 based on the control signal, for thereby controlling the output current of the inverter device to be in phase with or have a predetermined relationship to the voltage waveform of the commercial power supply system.

Consequently, the current supplied from the gas turbine generating facility to the commercial power supply system is the electric power which is in phase with the voltage of the commercial power supply system at a power factor of 1 or a certain power factor. In this manner, the operation to interconnect the gas turbine generating facility to the commercial power supply system is completed. The amount of the electric power delivered to the commercial power supply system is determined depending on the amount of energy that is fed into the gas turbine engine. However, the relationship between the voltage and current of the electric power to be delivered is kept at a power factor of 1 or a desired power factor at all times by the above PID control part.

In this manner, the gas turbine generating apparatus according to the present invention can be interconnected easily to the commercial power supply system, and can supply the electric power at a desired power factor, e.g., a power factor of 1, to the commercial power supply system.

Figure 5:
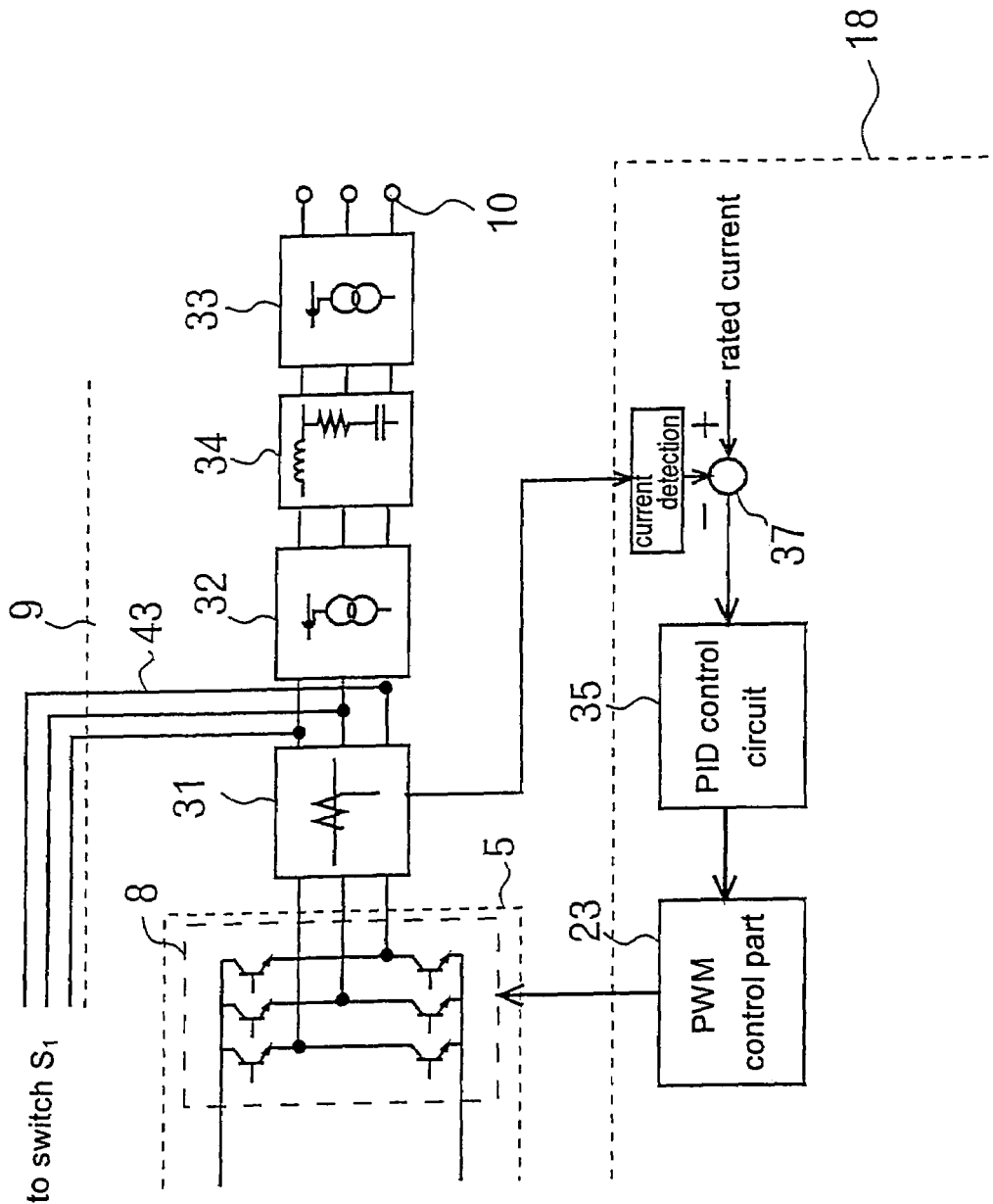
FIG. 5 is a view showing an essential part of a control system according to a second embodiment of the present invention.

Next, the starting operation of the generating apparatus will be described with reference to FIG. 5. The inverter control part 18 comprises a PID control circuit 35. The PID control circuit 35 controls such that the output current of the inverter device 5 agrees with a rated current of the generator (motor) 4 (see FIG. 1) at all times at the time of starting. Specifically, the comparator 37 calculates an error signal between a command signal defined by the rated current of the generator (motor) 4 (see FIG. 1) and a feedback signal defined by the signal from the current detector (CT) 31 which detects the output current of the inverter device 5. The PID control circuit 35 generates a control signal for eliminating the error signal. The PWM control part 23 performs a pulse-width-modulation control on the inverter 8 based on the control signal.

Accordingly, at the time of starting, the inverter device 5 increases an output frequency from zero to a predetermined rotational speed within a short period of time, while the output voltage is controlled to keep the output current constant. Therefore, the rated current is supplied constantly to the generator which is operated as a motor at the time of starting, thus enabling the generator to generate a maximum torque thereof. When the generator which is operated as a motor reaches a predetermined speed, the gas turbine engine is ignited. Subsequently, the rotational speed of the gas turbine engine is increased by the combustion of a fuel gas, thus allowing the generator to generate the electric power.

As described above, the gas turbine generating apparatus according to the present invention can be started safely and easily in a shortest period of time within the range of the electric power capacity of the generator which is operated as a motor.

The gas turbine generating apparatus according to the present invention is not limited to the illustrated example, but various changes and modifications may be made thereto without departing from the scope of the present invention.

INDUSTRIAL APPLICABILITY

The present invention is utilized for a gas turbine generating apparatus suitable for use as a local-distributed power supply. Particularly, the present invention is suitable for use as a gas turbine generating apparatus which is small in size and is capable of a high-speed operation.

The invention claimed is:
1. A gas turbine generating apparatus comprising:
a gas turbine capable of a high-speed operation;
a permanent-magnet-type generator driven by said gas turbine at a high speed;
an inverter device for converting alternating-current power generated by said permanent magnet type generator into commercial alternating-current power; and
a control device for operating said permanent-magnet-type generator as a motor at a time of starting said gas turbine, and supplying alternating-current power from a direct-current power supply through said inverter device or another inverter device in addition to said inverter device to said permanent magnet type generator for increasing a rotational speed smoothly from zero;
wherein said control device detects output current of said inverter device and controls said inverter device to keep the output current constant by supplying a rated current of said permanent magnet type generator constantly to said permanent magnet type generator.

2. A gas turbine generating apparatus according to claim 1, wherein said control device increases an output frequency of said inverter device from zero to a predetermined frequency within a short period of time when said gas turbine is started.

3. A gas turbine generating apparatus according to claim 1, wherein said direct-current power supply used to start said gas turbine comprises a storage battery.

4. A gas turbine generating apparatus according to claim 1, wherein said direct-current power supply used to start said gas turbine is produced by rectifying alternating-current power of a commercial AC power supply system.

* * * * *